(12) United States Patent
Wu et al.

(10) Patent No.: US 7,110,162 B2
(45) Date of Patent: Sep. 19, 2006

(54) ELECTROPHORETIC DISPERSION WITH A FLUORINATED SOLVENT AND A CHARGE CONTROLLING AGENT

(75) Inventors: Zarng-Arh George Wu, San Jose, CA (US); Huiyong Paul Chen, San Jose, CA (US); Wan Peter Hsu, Fremont, CA (US); Rongchi Yu, Glenmont, NY (US); Mahmoud-Zohdi Armoush, Santa Clara, CA (US); Rong-Chang Liang, Cupertino, CA (US)

(73) Assignee: SiPix Imaging, Inc., Fremont, CA (US)

( * ) Notice: Subject to any disclaimer, the term of this patent is extended or adjusted under 35 U.S.C. 154(b) by 676 days.

(21) Appl. No.: 10/335,210

(22) Filed: Dec. 31, 2002

(65) Prior Publication Data

US 2003/0169227 A1    Sep. 11, 2003

Related U.S. Application Data

(60) Provisional application No. 60/345,936, filed on Jan. 3, 2002.

(51) Int. Cl.
*G02B 26/00* (2006.01)
*G03G 17/04* (2006.01)
*G09G 3/34* (2006.01)

(52) U.S. Cl. .................. 359/296; 345/107; 430/32; 430/38

(58) Field of Classification Search ............... 252/582; 345/107; 359/296; 430/32, 34, 38; 524/268
See application file for complete search history.

(56) References Cited

U.S. PATENT DOCUMENTS

| | | | |
|---|---|---|---|
| 3,668,106 A | 6/1972 | Ota | 204/299 |
| 3,960,814 A | 6/1976 | Cochoy | 260/47 R |
| 4,071,430 A | 1/1978 | Liebert | 204/299 |
| 4,085,137 A | 4/1978 | Mitsch et al. | 260/561 HL |
| 4,093,534 A | 6/1978 | Carter et al. | 359/296 |
| 4,285,801 A | 8/1981 | Chiang | 204/299 |
| 4,620,916 A | 11/1986 | Zwemer et al. | 204/299 R |
| 4,680,103 A | 7/1987 | Beilin Solomon I. et al. | 204/299 |
| 4,891,245 A | 1/1990 | Micale | 427/213.3 |
| 4,999,333 A | 3/1991 | Usami et al. | 503/209 |
| 5,204,185 A | 4/1993 | Seitz | 428/402.21 |
| 5,380,362 A | 1/1995 | Schubert | 106/493 |
| 5,403,518 A | 4/1995 | Schubert | 252/572 |
| 5,443,908 A | 8/1995 | Matsushita et al. | 428/402.24 |
| 5,573,711 A | 11/1996 | Hou et al. | 252/572 |
| 5,914,806 A | 6/1999 | Gordon II et al. | 359/296 |
| 5,930,026 A | 7/1999 | Jacobson et al. | 359/296 |
| 5,961,804 A | 10/1999 | Jacobson et al. | 204/606 |
| 6,017,584 A | 1/2000 | Albert et al. | 427/213.3 |
| 6,162,521 A | 12/2000 | Falcone | 428/65.4 |
| 6,184,856 B1 | 2/2001 | Gordon, II et al. | 345/107 |
| 6,187,954 B1 | 2/2001 | Falcone | 564/136 |
| 6,261,483 B1 | 7/2001 | Frank et al. | 264/4.1 |
| 6,400,492 B1* | 6/2002 | Morita et al. | 359/296 |
| 2003/0151029 A1* | 8/2003 | Hsu et al. | 252/500 |
| 2003/0164480 A1* | 9/2003 | Wu et al. | 252/572 |

FOREIGN PATENT DOCUMENTS

| | | |
|---|---|---|
| EP | 336666 | 10/1989 |
| EP | 562344 | 9/1993 |
| WO | WO 95/33085 | 12/1995 |
| WO | WO 01/067170 | 9/2001 |
| WO | WO 02/01281 | 1/2002 |
| WO | WO 02/056097 | 7/2002 |
| WO | WO 02/65215 | 8/2002 |

OTHER PUBLICATIONS

Schmidt, S., et al, *Handbook of Imaging Materials*, Marcel Dekker, Inc . Chp. 6, pp. 227-252.
Fowkes F. et al., "Mechanism of Electric Charging of Particles in Nonaqueous Liquids", *Colloids and Surfaces in Reprographic Technology*, pp. 307-324.
Kondo, A., *Microcapsule Processing and Technology*, Marcel Dekker, Inc., 1979. (entire book).
Hopper, M., et al. "An Electrophoretic Display, Its Properties, Model and Addressing". *IEEE Transactions on Electron Devices*, vol. 26, No. 8, pp. 1148-1152, 1979.
Dalisa, A.L., "Electrophoretic Display Technology", *IEEE Transactions of Electron Devices*. Jul. 1997:827-834.
Murau, P., et al., "The Understanding and Elimination of Some Suspension Instabilities in an Electrophoretic Display", *J. Appl. Phys.*, 49(9). (1978).
Caporicco, G., et al., "Low Temperature Elastomeric Polyamides Containing Perfluorinated Polyether Building Blocks". *Makromol. Chem.* 184:935-947 (1983).
Malik, A.A., et al., "Synthesis of Fluorinated Drisocyanates", *J. Org. Chem.* 56: 3043-3044 (1991).
Liang, R.C et al., "Microcup Electrophoretic Display by Roll-to-Roll Manufacturing Processes" *Proc. of the IDW '02*, International Conference Center Hiroshima (2002).

* cited by examiner

Primary Examiner—David N. Spector
(74) Attorney, Agent, or Firm—Howrey LLP

(57) ABSTRACT

The invention relates to a novel electrophoretic dispersion comprising a fluorinated solvent as the continuous phase, charged pigment particles or pigment containing microcapsules as the dispersed phase, and the charge of the pigment particles is provided by a charge controlling agent comprising:
 (i) a soluble fluorinated electron accepting or proton donating compound or polymer in the continuous phase and an electron donating or proton accepting compound or polymer in the dispersed phase; or
 (ii) a soluble fluorinated electron donating or proton accepting compound or polymer in the continuous phase and an electron accepting or proton donating compound or polymer in the dispersed phase.

60 Claims, No Drawings

ELECTROPHORETIC DISPERSION WITH A FLUORINATED SOLVENT AND A CHARGE CONTROLLING AGENT

CROSS-REFERENCE TO RELATED APPLICATION

This application claims the benefit of U.S. Provisional Application Ser. No. 60/345,936, filed Jan. 3, 2002, the content of which is incorporated herein by reference in its entirety.

BACKGROUND OF THE INVENTION a) Field of the Invention

This invention relates to an electrophoretic dispersion that comprises charged pigment particles dispersed in a fluorinated dielectric solvent and a charge controlling agent. The dispersion may be used in all types of electrophoretic displays including transmissive, reflective and transflective displays which may have the traditional up/down switching mode, the in-plane switching mode or the dual switching mode.

b) Description of Related Art

The electrophoretic display (EPD) is a non-emissive device based on the electrophoresis phenomenon influencing charged pigment particles suspended in a colored dielectric solvent. This general type of display was first proposed in 1969. An EPD typically comprises a pair of opposed, spaced-apart plate-like electrodes, with spacers predetermining a certain distance between the electrodes. At least one of the electrodes, typically on the viewing side, is transparent. For the passive type of EPDs, row and column electrodes on the top (the viewing side) and bottom plates respectively, are needed to drive the displays. In contrast, an array of thin film transistors (TFTs) on the bottom plate and a common, non-patterned transparent conductor plate on the top viewing substrate are required for the active type EPDs. An electrophoretic fluid composed of a colored dielectric solvent and charged pigment particles dispersed therein is enclosed between the two electrodes.

When a voltage difference is imposed between the two electrodes, the pigment particles migrate by attraction to the plate of polarity opposite that of the pigment particles. Thus, the color showing at the transparent plate, determined by selectively charging the plates, can be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages.

To view a reflective EPD, an external light source is needed. For applications to be viewed in the dark, either a backlight system or a front pilot light system may be used. A transflective EPD equipped with a backlight system is typically preferred over a reflective EPD with a front pilot light because of cosmetic and light management reasons. However, the presence of light scattering particles in traditional EPD cells greatly reduces the efficiency of the backlight system. A high contrast ratio in both bright and dark environments therefore is difficult to achieve for traditional EPDs.

A transmissive EPD is disclosed in U.S. Pat. No. 6,184,856 in which a backlight, color filters and substrates with two transparent electrodes are used. The electrophoretic cells serve as a light valve. In the collected state, the particles are positioned to minimize the coverage of the horizontal area of the cell and allow the backlight to pass through the cell. In the distributed state, the particles are positioned to cover the horizontal area of the pixel and scatter or absorb the backlight. However, the backlight and color filter used in this device consume a great deal of power and therefore are not desirable for hand-held devices such as PDAs (personal digital assistants) and e-books.

EPDs of different pixel or cell structures have been reported previously, for example, the partition-type EPD (M. A. Hopper and V. Novotny, *IEEE Trans. Electr. Dev.*, 26(8):1148–1152 (1979)) and the microencapsulated EPD (U.S. Pat. Nos. 5,961,804 and 5,930,026). However, both types have their own problems as noted below.

In the partition-type EPD, there are partitions between the two electrodes for dividing the space into smaller cells in order to prevent undesired movement of the particles such as sedimentation. However, difficulties are encountered and they include formation of the partitions, filling the display with an electrophoretic fluid, enclosing the fluid in the display and keeping the fluids of different colors separated from each other.

The microencapsulated EPD has a substantially two dimensional arrangement of microcapsules each having therein an electrophoretic composition of a dielectric fluid and a dispersion of charged pigment particles that visually contrast with the dielectric solvent. The microcapsules are typically prepared in an aqueous solution, and to achieve a useful contrast ratio, their mean particle size is relatively large (50–150 microns). The large microcapsule size results in poor scratch resistance and a slow response time for a given voltage because a large gap between the two opposite electrodes is required for large capsules. Also, the hydrophilic shell of microcapsules prepared in an aqueous solution typically results in sensitivity to high moisture and temperature conditions. If the microcapsules are embedded in a large quantity of a polymer matrix to obviate these shortcomings, the use of the matrix results in an even slower response time and/or a lower contrast ratio. To improve the switching rate, a charge-controlling agent (CCA) is often needed in this type of EPDs. However, the microencapsulation process in an aqueous solution imposes a limitation on the type of CCAs that can be used. Other drawbacks associated with the microcapsule system include poor resolution and poor addressability for color applications.

An improved EPD technology was recently disclosed in co-pending applications, U.S. Ser. No. 09/518,488, filed on Mar. 3, 2000 (corresponding to WO 01/67170 published on Sep. 13, 2001), U.S. Ser. No. 09/759,212, filed on Jan. 11, 2001 (corresponding to WO02/56097), U.S. Ser. No. 09/606,654, filed on Jun. 28, 2000 (corresponding to WO02/01281) and U.S. Ser. No. 09/784,972, filed on Feb. 15, 2001 (corresponding to WO02/65215), all of which are incorporated herein by reference. The improved EPD comprises isolated cells formed from microcups of well-defined shape, size and aspect ratio and filled with charged pigment particles dispersed in a dielectric solvent. The filled cells are individually sealed with a polymeric sealing layer, preferably formed from a composition comprising a thermoset or thermoplastic precursor.

The microcup structure enables a format flexible and efficient roll-to-roll continuous manufacturing process for the EPDs. The displays can be prepared on a continuous web of a conductor film such as ITO/PET by, for example, (1) coating a radiation curable composition onto the ITO/PET film, (2) making the microcup structure by a microembossing or photolithographic method, (3) filling the microcups with an electrophoretic fluid and sealing the microcups, (4) laminating the sealed microcups with the other conductor film and (5) slicing and cutting the display into a desirable size or format for assembling.

One advantage of this EPD design is that the microcup wall is in fact a built-in spacer to keep the top and bottom substrates apart at a fixed distance. The mechanical properties and structural integrity of this type of displays are significantly better than any prior art displays including those manufactured by using spacer particles. In addition, displays involving microcups have desirable mechanical properties including reliable display performance when the display is bent, rolled or under compression pressure from, for example, a touch screen application. The use of the microcup technology also eliminates the need of an edge seal adhesive which would limit and predefine the size of the display panel and confine the display fluid inside a predefined area. The display fluid within a conventional display prepared by the edge sealing adhesive method will leak out completely if the display is cut in any way or if a hole is drilled through the display. The damaged display will be no longer functional. In contrast, the display fluid within the display prepared by the microcup technology is enclosed and isolated in each cell. The microcup display may be cut into almost any dimensions without the risk of damaging the display performance due to the loss of display fluid in the active areas. In other words, the microcup structure enables a format flexible display manufacturing process, wherein the process produces a continuous output of displays in a large sheet format which can be cut into any desired sizes. The isolated microcup or cell structure is particularly important when cells are filled with fluids of different specific properties, such as colors and switching rates. Without the microcup structure, it will be very difficult to prevent the fluids in adjacent areas from intermixing or being subject to cross-talk during operation.

For applications to be viewed in dark environments, the microcup structure effectively allows the backlight to reach the viewer through the microcup walls. Unlike traditional EPDs, even a low intensity backlight is sufficient for users to view in the dark the transflective EPDs based on the microcup technology. A dyed or pigmented microcup wall may be used to enhance the contrast ratio and optimize the intensity of backlight transmitted through the microcup EPDs. A photocell sensor to modulate the backlight intensity might also be used to further reduce the power consumption of such EPDs.

The microcup EPDs may have the traditional up/down switching mode, the in-plane switching mode or the dual switching mode. In the display having the traditional up/down switching mode or the dual switching mode, there are a top transparent electrode plate, a bottom electrode plate and a plurality of isolated cells enclosed between the two electrode plates. In the display having the in-plane switching mode, the cells are sandwiched between a top transparent insulator layer and a bottom electrode plate.

For all types of the EPDs, the dispersion contained within the individual cells of the display is undoubtedly one of the most crucial parts of the device. The dispersion, as stated earlier, usually is composed of pigment particles dispersed in a dielectric solvent. The composition of the dispersion determines, to a large extent, the lifetime, contrast ratio, switching rate, response waveform and bistability of the device. In an ideal dispersion, the pigment particles remain separate and do not agglomerate under all operating conditions. Furthermore, all components in the dispersion must be chemically stable and compatible not only with each other but also with the other materials present in an EPD, such as the electrodes and sealing materials.

The pigment particles in the dispersion may exhibit a native charge, or may acquire a charge when suspended in the dielectric solvent or may be charged using a charge controlling agent (CCA). The use of a CCA in a dispersion with a hydrocarbon solvent such as alkanes and alkylbenzenes is well known in the prior art. The mechanisms of electrically charging particles in a nonaqueous liquid have been reviewed by Fowkes, et al. in ACS Symp. # 200, "Colloids and Surfaces in Reprographic Technologies", pp. 307 (1982) and by Schmidt, et al., "Liquid Toner Technology", Chapter 6 in "Handbook of Imaging Materials", (1991). Particles dispersed in a hydrocarbon solvent may be charged by the addition of a surfactant or CCA. Acid-base chemistry between the particles and the ionic surfactant micelles is believed to result in charging of the particles. The formation of negatively charged particles is enhanced by proton or cation exchange from the particles to the micelles and formation of positively charged particles is enhanced by proton or cation exchange from the micelles to the particles. The magnitude of the zeta potential increases with stronger acid base interaction and decreases with an increasing dielectric constant of the solvent. A diffuse double layer with zeta potentials exceeding 100 mV has been demonstrated in the case of strong acid-base interactions. Examples of typical CCAs for the hydrocarbon dielectric solvents include metal dialkylsulfosuccinate, metal petronate, metal dialkylnaphthalene sulfonate, metal alkylsalicylate, metal alkylaryl sulfonate, metal stearate, Fluorad® perfluoro surfactants from 3M, copolymers of long-chain methacrylate or alphaolefins with acidic or basic comonomers, polyisobutylene succinimides, soy lecithin, N-vinyl pyrrolidone copolymers and the like.

Highly fluorinated polymers having chains longer than $C_8$ have been disclosed in U.S. Pat. No. 4,285,801 (1981) as dispersants or CCAs for EPD applications particularly for EPDs using a hydrocarbon as the dielectric solvent. The polymers include highly fluorinated long chain alkyl or akylaryl carboxylic acids, sulfonic acids, and phosphoric acids, their esters and metal salts, highly fluorinated long-chain alkyl and alkylaryl alcohols, highly fluorinated A-B block copolymers of a long-chain alkyl or alkylaryl alcohol with ethylene glycol or propylene glycol, highly fluorinated poly(alkyl methacrylate) and their copolymers.

Halogenated solvents of high specific gravity have been widely used in EPD applications particularly in those involving an inorganic pigment, such as $TiO_2$, as the charged whitening or coloring particle. The halogenated solvents of high specific gravity are very useful in reducing the rate of sedimentation of the pigment particles in the solvent. Fluorinated solvents are among the most preferred because they are chemically stable and environmentally friendly. However, most CCAs and dispersants suitable for use in hydrocarbon solvents are not effective for dispersions in fluorinated solvents particularly high boiling-point perfluorinated solvents. This could be due to poor solubility or charge separation of the CCAs in these solvents. As a result, pigment particles are very difficult to disperse in perfluorinated solvents. Therefore, EPDs based on perfluorinated dielectric solvents typically show poor stability and switching performance.

To improve the stability and display performance of EPDs based on fluorinated solvents, an electrophoretic fluid comprising 22.5 to 44.25 wt % of a hydrocarbon solvent, 54.42–75.20 wt % of at least one chlorine-free fluorinated solvent and 0.1 to 1.5 wt % of a fluorosurfactant was taught in U.S. Pat. No. 5,573,711 (1996). The presence of a hydrocarbon solvent such as phenylxylylethane, phenyloctane, decahydronaphthalene or xylene was claimed to result in a stronger solvent system that gives a better display performance. However, the use of hydrocarbon solvents in any significant amount is undesirable because it lowers the specific gravity of the solvent and, as a result, increases the sedimentation rate of the pigment particles particularly when a pigment of high specific gravity, such as $TiO_2$, is used.

Thus, there is still a need for an EPD with improved performance resulting from improved design in the dielectric solvent, CCA and particle system selection.

SUMMARY OF THE INVENTION

The present invention is directed to a novel electrophoretic dispersion in which a fluorinated solvent or solvent mixture is used as the suspending medium. More specifically, the first aspect of the invention relates to an electrophoretic dispersion comprising a fluorinated solvent or solvent mixture as the continuous phase, charged pigment particles particularly polymer coated or microencapsulated pigment particles as the dispersed phase and the charge of the pigment particles or pigment containing particles is mainly provided by a CCA system comprising:
  (i) a soluble fluorinated electron accepting or proton donating compound or polymer in the continuous phase and an electron donating or proton accepting compound or polymer in the dispersed phase; or
  (ii) a soluble fluorinated electron donating or proton accepting compound or polymer in the continuous phase and an electron accepting or proton donating compound or polymer in the dispersed phase.

The electron donating or proton accepting or electron accepting or proton donating compound or polymer in the dispersed phase may be on the surface of the particles.

The second aspect of the invention relates to an EPD which comprises:
  (a) a top layer and a bottom layer, at least one of which is transparent,
  (b) an array of cells sandwiched between the two layers and the cells are filled with an electrophoretic dispersion, which dispersion comprises a fluorinated solvent or solvent mixture as the continuous phase, charged pigment particles or pigment-containing particles as the dispersed phase, and the charge of the pigment particles or pigment-containing particles is mainly provided by:
    (i) a soluble fluorinated electron accepting or proton donating compound or polymer in the continuous phase and an electron donating or proton accepting compound or polymer in the dispersed phase; or
    (ii) a soluble fluorinated electron donating or proton accepting compound or polymer in the continuous phase and an electron accepting or proton donating compound or polymer in the dispersed phase.

In this aspect of the invention, the electron donating or proton accepting or electron accepting or proton donating compound or polymer in the dispersed phase may also be on the surface of the particles.

The EPD may have the traditional up-down switching mode, the in-plane switching mode or the dual switching mode.

In the EPD with the traditional up-down switching mode or the dual switching mode, both the top and bottom layers are electrode plates. In the EPD with the in-plane switching mode, one of the layers is an electrode plate and the other layer is an insulating layer.

The CCA system of the present invention may be incorporated into the electrophoretic dispersion in a variety of ways. For example, a proton acceptor of (i) may be applied to the pigment particles or added into the dispersed phase (internal phase) before microencapsulation and a soluble fluorinated proton donor of (i) may be added into the continuous phase. Similarly, a proton donor of (ii) may be applied to the pigment particles or added into the dispersed phase (internal phase) before microencapsulation and a soluble fluorinated proton acceptor of (ii) may be added into the continuous phase.

Another alternative for the CCA system of the present invention results from the presence of the required donor/acceptor components in the same molecule. For example, one part of a molecule can represent, and function as, the soluble fluorinated donor/acceptor and another part can represent, and function as, the complementary insoluble acceptor/donor. The presence of both the soluble fluorinated donor/acceptor and the complimentary insoluble acceptor/donor in the same CCA molecule results in a high surface activity and a strong adsorption of the CCA onto the particles.

Each of the two agents, namely the proton acceptor and the soluble fluorinated proton donor of (i) or the proton donor and the soluble fluorinated proton acceptor of (ii), may be present in the amount of from 0.05 to 30 weight % based on the pigment containing microparticles or microcapsules, preferably from 0.5 to 15%, in the dispersion.

In order for the electrophoretic dispersion to achieve high hiding power or light scattering efficiency, high dispersion stability, low rate of sedimentation or creaming and high electrophoretic mobility even at a high solid content and under a wide range of applied voltages, the pigment particles may be microencapsulated or coated with a polymer matrix of low specific gravity. The density of the pigment-containing microcapsules or microparticles may be matched to that of the dielectric solvent used in the EPD.

Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation. A review of a variety of microencapsulation processes can be found in "Microcapsule Processing and Technology" by A. Kondo (Marcel Dekker, 1979).

The third aspect of this invention relates to a novel microencapsulation process using reactive CCAs to form part of the charged shell of the pigment microcapsules or microparticles.

DETAILED DESCRIPTION OF THE INVENTION

Unless defined otherwise in this specification, all technical terms are used herein according to their conventional definitions as they are commonly used and understood by those of ordinary skill in the art. Tradenames are identified for materials used and their sources are also given. The term "particle" is understood to broadly cover all particulate matters including microparticles and microcapsules having pigment particles dispersed therein.

The novel electrophoretic dispersion of the present invention comprises a fluorinated, particularly a perfluorinated, solvent as the continuous phase and charged pigment particles as the dispersed phase, and the charge of the pigment particles is mainly provided by a CCA system comprising:

(i) a soluble fluorinated electron accepting or proton donating compound or polymer in the continuous phase and an electron donating or proton accepting compound or polymer in the dispersed phase; or a soluble fluorinated electron donating or proton accepting compound or polymer in the continuous phase and an electron accepting or proton donating compound or polymer in the dispersed phase.

The electron donating or proton accepting or electron accepting or proton donating compound or polymer in the dispersed phase may be on the surface of the particles.

I. The Electrophoretic Dispersion of the Present Invention

A. Suitable Solvents for the Dispersion

Suitable solvents generally have low vapor pressure, low viscosity and a dielectric constant in the range of about 1.7 to about 30, preferably about 1.7 to about 5. Examples of suitable fluorinated solvents include, but are not limited to, perfluorinated solvents such as perfluoroalkanes or perfluorocycloalkanes (e.g., perfluorodecalin), perfluoroarylalkanes (e.g., perfluorotoluene or perfluoroxylene), perfluoro-tert-amines, perfluoropolyethers such as those from Galden/Fomblin and perfluoropolyethers HT series, and hydrofluoropolyethers (ZT series) from Ausimont, FC-43 (heptacosafluorotributylamine), FC-70 (perfluorotri-n-pentylamine), PF-5060 or PF-5060DL (pefluorohexane) from 3M Company (St. Paul, Minn.), low molecular weight (preferably less than 50,000, more preferably less than 20,000) polymers or oligomers such as poly(perfluoropropylene oxide) from TCI America (Portland, Oreg.), poly (chlorotrifluoroethylene) such as Halocarbon Oils from Halocarbon Product Corp. (River Edge, N.J.), Krytox® K-fluids (trifluorohomopolymer) from Dupont, and Demnum lubricating oils from Daikin Industries. Perfluoropolyethers and hydrofluoropolyethers such as Ausimont HT-170, HT-200, HT-230, ZT-180 and Dupont trifluoro(trifluoromethyl)oxirane homopolymers (such as K-6 and K-7 fluids) are useful.

B. Pigment Particles

The charged pigment particles visually contrast with the fluorinated solvent in which the particles are suspended. The primary pigment particles may be organic or inorganic pigments, such as $TiO_2$, phthalocyanine blue, phthalocyanine green, diarylide yellow, diarylide AAOT Yellow, and quinacridone, azo, rhodamine, perylene pigment series from Sun Chemical, Hansa yellow G particles from Kanto Chemical and Carbon Lampblack from Fisher. The pigment particles may be prepared by any of the well-known methods including grinding, milling, attriting, microfluidizing and ultrasonic techniques. For example, pigment particles in the form of a fine powder are added to the suspending solvent and the resulting mixture is ball milled or attrited for several hours to break up the highly agglomerated dry pigment powder into primary particles. Particle size of the pigment particles may be in the range of 0.01–10 microns, preferably in the range of 0.05–3 microns. These particles should have acceptable optical characteristics, should not be swollen or softened by the dielectric solvent and should be chemically stable. The resulting dispersion must also be stable against sedimentation, creaming or flocculation under normal operating conditions.

C. Microencapsulated Pigment Particles

In order for the electrophoretic dispersion to achieve high hiding power or light scattering efficiency, high dispersion stability, low rate of sedimentation or creaming and high electrophoretic mobility even with a high solid content and under a wide range of applied voltages, the pigment particles may be microencapsulated or coated with a polymer matrix of low specific gravity. Microencapsulation of the pigment particles may be accomplished chemically or physically. Typical microencapsulation processes include interfacial polymerization/crosslinking, in-situ polymerization/crosslinking, phase separation, simple or complex coacervation, electrostatic coating, spray drying, fluidized bed coating and solvent evaporation.

One embodiment of this invention is the novel microencapsulation process which involves interfacial polymerization using reactive CCAs to form part of a charged, crosslinked shell of the pigment containing microcapsules or microparticles. The microencapsulation process involves first preparing an internal phase dispersion comprising primary pigment particles, such as $TiO_2$, a reactive monomer or oligomer and optionally a diluent such as a volatile organic solvent. The internal phase may also have a dispersant to facilitate the dispersion of the primary pigment particles in the internal phase which is achieved by a conventional dispersing or milling mechanism such as homogenizer, sonicator, colloidal mill, high shear mixer and the like.

Reactive monomers suitable for the interfacial polymerization/crosslinking of the present invention include multifunctional isocyanates, thioisocyanates, epoxides, acid chlorides, chloroformates, alkoxysilanes, anhydrides, alcohols, thiols, amines and their precondensates. In one embodiment, reactive monomers may be multifunctional amines (primary and secondary), thiols, isocyanates, thioisocyanates, epoxides and their precondensates. The reactive monomer or oligomer may be present in the amount of from 5 to 300 wt % based on the primary pigment particles, preferably from 50 to 150 wt %, more preferably from 80 to 120 wt %.

The resultant internal phase pigment dispersion is then emulsified into a continuous phase which comprises a protective colloid and reactive CCA(s) in a fluorinated solvent. The reactive CCA(s) may be pre-emulsified by the protective colloid in the fluorinated solvent.

In this system, a reactive CCA (i.e., an electron acceptor or proton donor, or an electron donor or proton acceptor, having at least one reactive moiety) may be added directly to the internal phase dispersion, and a soluble fluorinated reactive CCA (i.e., a soluble fluorinated electron donor or proton acceptor, or a soluble fluorinated electron acceptor or proton donor, having at least one reactive moiety) may be added to the continuous phase. Alternatively, both the reactive CCA and the soluble fluorinated reactive CCA may be added together to the continuous phase and in this case the reactive CCA will diffuse through the solvent to the surface of the microcapsules.

In another embodiment, the CCA having a fluorinated donor/acceptor moiety and a complementary acceptor/donor moiety in the same molecule may be used. In these surface active CCAs, the fluorinated donor/acceptor moiety is compatible with the continuous phase whereas the complementary acceptor/donor moiety is incompatible with the continuous phase. The reactive functional groups for interfacial polymerization/crosslinking may be attached to the moiety that is not compatible with the continuous phase.

In still another embodiment, the reactive CCA is a reactive dispersion stabilizer or protective colloid which after being bonded to the particles improves the dispersion stability and shelf life of the EPDs.

The reactive CCAs may have at least one functional group to react with the functional monomers or oligomers in the internal phase. A hard shell is formed around the internal dispersion phase as a result of the interfacial reaction between the reactive monomer or oligomer from the internal phase and the reactive functional groups of the CCA. Protective colloids or dispersants may be added in the continuous phase to improve the dispersion stability and control the particle size and particle size distribution of the microcapsules. The protective colloids may comprise a reactive functional group which may also react with the functional monomers or oligomers in the internal phase to form a crosslinked shell.

Examples of suitable protective colloids include amino- or hydroxy-functionalized fluorinated, particularly perfluorinated, polymers or oligomers derived from perfluorinated hydrocarbons or perfluoropolyethers (from Du Pont and Ausimont). The polyfluoroether amines such as those exemplified as Formula I in Example 7 of the present application are useful. Suitable polyfluoroether amines may have molecular weights ranging from 300 to 50,000, preferably from 500 to 15,000. Generally they may be prepared under mild conditions by reacting a polyfluoroether substituted with at least one ester group with a multifunctional amine.

The resultant pigment microcapsules may be further hardened by solvent evaporation or in-situ polymerization/crosslinking in the internal phase. Suitable monomers or oilgomers for the in-situ polymerization/crosslinking reaction in the internal phase include monomers for radical or ionic polymerization such as vinyls, acrylates, methacrylates, styrenes, allyls, vinylethers and their multifunctional derivatives, and monomers for condensation polymerization such as polyols, polythiols, anhydrides, polyamines, isocyanates, thioisocyanates and epoxides.

The size of the microencapsulated pigment particles may range from 0.1–10 microns, preferably 0.3–3 microns.

D. The Charge Controlling System of the Present Invention

The pigment particles or microcapsules are charged using a CCA system. Specifically, the charge of the particles is provided by:

(i) a soluble fluorinated electron accepting or proton donating compound or polymer in the continuous phase and an electron donating or proton accepting compound or polymer in the dispersed phase; or (ii) a soluble fluorinated electron donating or proton accepting compound or polymer in the continuous phase and an electron accepting or proton donating compound or polymer in the dispersed phase.

The electron donating or proton accepting or electron accepting or proton donating compound or polymer in the dispersed phase may be on the surface of the particles.

Electron Accepting or Proton Donating Compounds or Polymers in the Dispersed Phase or on the Particle Surface Examples of the suitable electron accepting or proton donating compounds or polymers in the dispersed phase or on the surface of the particle include alkyl, aryl, alkylaryl or arylalkyl carboxylic acids and their salts, alkyl, aryl, alkylaryl or arylalkyl sulfonic acids and their salts, tetra-alkylammonium and other alkylaryl ammonium salts, pyridinium salts and their alkyl, aryl, alkylaryl or arylalkyl derivatives, sulfonamides, perfluoroamides, alcohols, phenols, salicylic acids and their salts, acrylic acid, sulfoethyl methacrylate, styrene sulfonic acid, itaconic acid, maleic acid, hydrogen hexafluorophosphate, hydrogen hexafluoroantimonate, hydrogen tetrafluoroborate, hydrogen hexafluoroarsenate (V) and the like. The alkyl, alkylaryl, arylalkyl and aryl groups may have up to 30 carbon atoms. Organometallic compounds or complexes containing an electron deficient metal group such as tin, zinc, magnesium, copper, aluminum, cobalt, chromium, titanium, zirconium and derivatives and polymers thereof, may also be used. In one embodiment of this invention, protonated polyvinylpyridine copolymers or their quaternary salts, copper or zirconium salts such as zirconium (tetraacetoacetate), zirconium acetoacetonate and copper acetoneacetonate may be used.

Soluble Fluorinated Electron Accepting or Proton Donating Compounds or Polymers in the Continuous Phase Examples of the soluble, fluorinated, electron accepting or proton donating compounds or polymers in the continuous phase include fluorinated alkyl, aryl, alkylaryl or arylalkyl carboxylic acids, fluorinated alkyl, aryl, alkylaryl or arylalkyl sulfonic acids, fluorinated sulfonamides, fluorinated carboxamides, fluorinated alcohols, fluorinated ether alcohols, fluorinated phenols, fluorinated salicylic acids, hydrogen hexafluorophosphate, hydrogen hexafluoroantimonate, hydrogen tetrafluoroborate, hydrogen hexafluoroarsenate (V), fluorinated pyridinium salts or quarternary ammonium salts and the like. Fluorinated organometallic compounds or fluorinated complexes containing an electron deficient metal group such as tin, zinc, magnesium, copper, aluminum, chromium, cobalt, titanium, zirconium and derivatives and polymers thereof, may also be used. The perfluorocarboxylic acids and salts or complexes include DuPont poly(hexafluoropropylene oxide), carboxylic acids such as Krytox® 157 FSL, Krytox® 157 FSM, Krytox® 157 FSH, the Demnum series manufactured by Daikin Ind., Ausimont Fluorolink® C and 7004 and the like. Fluorinated organometallic compounds include fluorinated metal phthalocyanine dyes as prepared by the method taught in U.S. Pat. No. 3,281,426 (1966), and other fluorinated metal complexes such as zirconium perfluoroacetoacetonates and copper perfluoroacetoacetonate which may be prepared from hexafluoroacetylacetone and metal chloride. For example, copper perfluoroacetoacetonate may be prepared by mixing appropriate amounts of copper chloride, dry methanol and hexafluoroacetylacetone and allowing the mixture to react in a dry box at room temperature. After the rate of hydrogen chloride evolution slows down, the mixture is refluxed for ½ hour under nitrogen atmosphere. Copper perfluoroacetoacetonate as a colorless crystalline solid may then be obtained by filtration followed by vacuum sublimation at room temperature.

Fluorinated quinolinol metal complexes are also useful. For example, fluorinated quinolinol Al complexes may be prepared by a two step procedure:

Step (1)

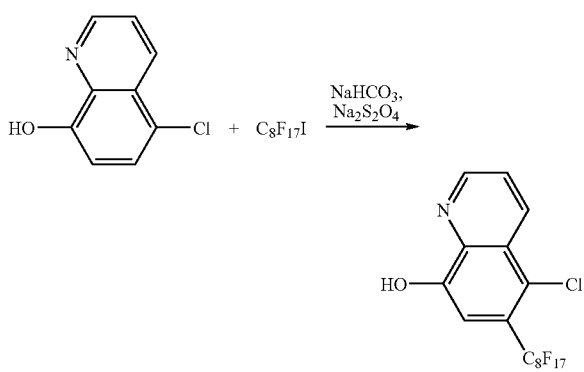

Step (2)

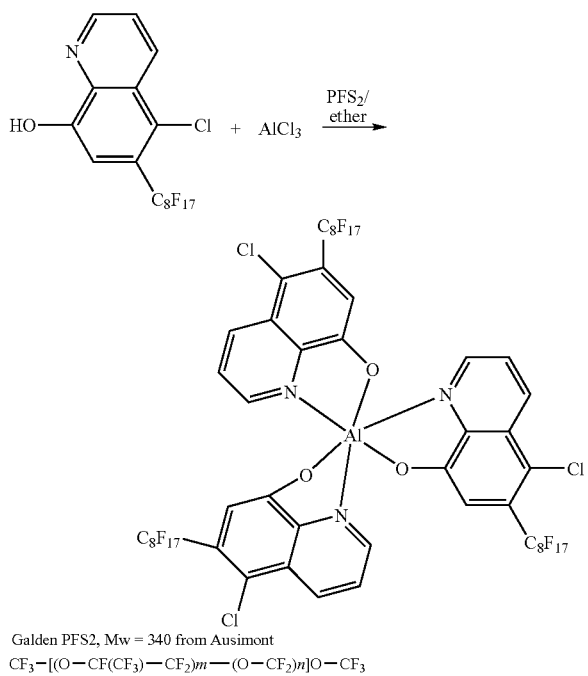

Galden PFS2, Mw = 340 from Ausimont
CF₃—[(O—CF(CF₃)—CF₂)m—(O—CF₂)n]O—CF₃

In one embodiment, soluble fluorinated electron accepting or proton donating compounds may include triflic acid, trifluoroacetic acid, perfluorinated amides, perfluorinated sulfonamide, and the Krytox® FS series, such as Krytox® FSL, zirconium and copper tetra(perfluoroacetoacetonate), fluorinated quinolinol Al complexes and fluorinated metal (such as Cu, Zn, Mg, Zr, and Si) phthalocyanine dyes.

Electron Donating or Proton Accepting Compounds or Polymers in the Dispersed Phase or on the Particle Surface Examples of the electron donating or proton accepting compounds or polymers include amines, particularly tert-amines or tert-anilines, pyridines, guanidines, ureas, thioureas, imidazoles, tetraarylborates and the alkyl, aryl, alkylaryl or arylalkyl derivatives thereof. The alkyl, alkylaryl, arylalkyl and aryl groups may have up to 30 carbon atoms. In one embodiment, compounds or polymers may be copolymers of 2-vinyl pyridine, 4-vinyl pyridine or 2-N,N-dimethylaminoethyl acrylate or methacrylate with styrene, alkyl acrylates or alkyl methacrylates or aryl acrylate or methacrylate, such as poly(4-vinylpyridine-co-styrene), poly(4-vinlypyridine-co-methyl methacrylate) or poly(4-vinlypyridine-co-butyl methacrylate).

Fluorinated Electron Donating or Proton Accepting Compounds or Polymers in the Continuous Phase Examples of the soluble, fluorinated electron donating or proton accepting compounds or polymers in the continuous phase may include fluorinated amines, particularly tert-amines or anilines, fluorinated pyridines, fluorinated alkyl or aryl guanidines, fluorinated ureas, fluorinated thioureas, fluorinated tetraarylborates, and derivatives and polymers thereof. The fluorinated amines may be derivatives of a perfluoropolyether, such as a precondensate of a multifunctional amine and a perfluoropolyether methyl ester.

Compounds with Donor/Acceptor and Fluorinated Acceptor/Donor Combination

Examples of compounds with donor/acceptor and fluorinated acceptor/donor combination include any of the previously mentioned compounds and derivatives and polymers thereof. The combination results in a zwitterionic type of CCA and has the advantages of improved performance and simpler composition with less individual components. The 'soluble' fluorinated portion of this combined CCA may extend into the continuous phase to maximize dispersion stability of the microparticles. The "insoluble" portion of the combined CCA may contain at least a reactive moiety for the interfacial reaction with the reactants in the dispersed particle phase. The shelf life stability and the switching performance of the microparticles in EPD devices are significantly improved since the CCA is covalently bonded to the microparticle via the interfacial reaction. Examples of this type of CCAs include the condensate product prepared from perfluoroester and, for examples, tris(2-aminoethyl)amine, diethylenetriamine, 1-[N,N-bis(2-hydroxyethyl)amino]2-propanol or their derivatives:

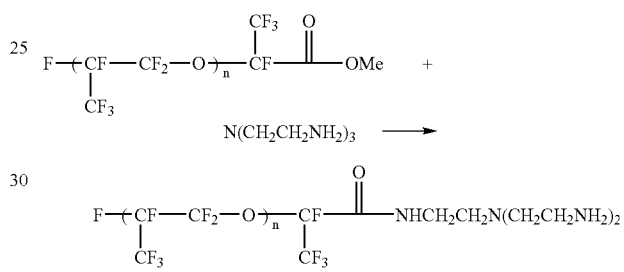

Reactive Charge Controlling Agents for Microencapsulation

The CCAs having reactive functional groups such as unsaturated double bonds including, but are not limited to vinyls, dienes, acrylates or methacrylates, primary or secondary amines, anilines, ureas, thioureas, alcohols, thiols, isocyanates, thioisocyanates, imines, epoxides, acid anhydrides, acid chlorides, chloroformates and the like are useful to be incorporated onto the surface of the microencapsulated pigment particles by interfacial reaction or in-situ polymerization.

Examples for these reactive CCAs for the in-situ radical polymerization process include 2-vinyl pyridine, 4-vinylpyridine, N,N-dimethylaminoethyl acrylate, methacrylic acid, acrylic acid, styrene sulfonic acid, itaconic acid, maleic acid, or their salts and derivatives or co-polymers thereof.

Examples for the reactive CCAs for the interfacial polymerization process may include 4-aminomethyl pyridine, 1-(2-aminoethyl)piperazine, 1-(3-aminopropyl)imidazole and sulfonated polyisocyanates and their salts.

Examples of the reactive CCAs for in-situ condensation polymerization may include triethanolamine, diethanolamine, 1-[N,N-bis(2-hydroxyethyl)amino]2-propanol, tris-(2-aminoethyl)amine, N,N-(2-hydroxyethyl)aniline, N,N,N',N'-tetrakis(2-hydroxypropyl)ethylenediamine, N,N,N',N'-tetrakis(2-hydroxyethyl)ethylenediamine and their derivatives.

The fluorinated reactive CCAs generally have at least one reactive functional moiety including unsaturated double bonds such as vinyls, dienes, acrylates or methacrylates, thiol, hydroxy, amide, primary and secondary amine or aniline, urea, thiourea, imine, isocyanate, thioisocyanate, epoxide, silane, chloroformate, acid anhydride, acid chloride and the like. In one embodiment, reactive moieties may be amine, thiol, hydroxy, thioisocyanate or isocyanate.

The CCA system of the present invention may be incorporated into the electrophoretic dispersion in different ways. For example, a proton accepter may be applied to the pigment particles or added into the internal phase dispersion before microencapsulation and a fluorinated proton donor may be added into the fluorinated continuous phase. Similarly, a proton donor may be applied to the pigment particles or added into the internal phase dispersion before microencapsulation and a fluorinated proton acceptor may be added into the fluorinated continuous phase.

Each of the two agents, namely, the proton acceptor and the fluorinated proton donor of (i) or the proton donor and the fluorinated proton acceptor of (ii), may be present in the range of from 0.05 to 30 weight % based on the pigment containing microparticles or microcapsules, preferably 0.5 to 15%, in the dispersion.

E. Contrast Colorants

In addition to the charged primary color pigment particles such as microencapsulated $TiO_2$ particles, a contrasting colorant may be used in EPDs of the present invention. The contrast colorant may be formed from dyes or pigments. In one embodiment, nonionic azo and anthraquinone dyes are useful. Examples of useful dyes include, but are not limited to: Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, and anthraquinone blue, anthraquinone yellow 114, anthraquinone reds 111 and 135 and anthraquinone green 28 from Aldrich. Perfluorinated dyes are particularly useful in this case where fluorinated or perfluorinated dielectric solvents are used. If the contrasting colorant is insoluble in the dielectric solvent, a non-charged dispersion of the colorant may be used. Particle size may be in the range of 0.01–5 microns, preferably in the range of 0.05–2 microns. If the contrasting colorant particles are charged, they may carry a charge which is opposite from that of the charged primary color pigment particles. If both types of particles carry the same charge, then they should have different charge density or different electrophoretic mobility. In any case, the dye or pigment used in EPDs must be chemically stable and compatible with other components in the dispersion. The dye or pigment for producing the contrast colorant may be predispersed in the dielectric solvent and added into the electrophoretic fluid containing the primary color pigment dispersion. For a black/white EPD, the dispersion comprises charged white particles of titanium oxide ($TiO_2$) dispersed in a blackened fluorinated dielectric solvent. A black dye or dye mixture such as Pylam Spirit Black and Fast Spirit Black from Pylam Products Co., Arizona, Sudan Black B from Aldrich, Thermoplastic Black X-70 from BASF or a black pigment such as carbon black may be used to generate the black color of the solvent. Modification of the dyes or pigments by introducing fluorinated or perfluorinated side chains such as $C_nF_{2n+1}$ (n=4–12) is useful to increase their solubility or dispersibility in highly fluorinated solvents. For a subtractive color system, the charged $TiO_2$ particles may be suspended in a fluorinated solvent of cyan, yellow or magenta color. The cyan, yellow or magenta color may be generated via the use of a dye or a pigment. For an additive color system, the charged $TiO_2$ particles may be suspended in a fluorinated solvent of a red, green or blue color generated also via the use of a dye or a pigment. For most applications, the additive color system may be used.

II. The Electrophoretic Display of the Present Invention

The electrophoretic display of the present invention comprises:
 (a) a top layer and a bottom layer, at least one of which is transparent,
 (b) an array of cells sandwiched between the two layers and the cells are filled with an electrophoretic dispersion, which dispersion comprises a fluorinated solvent or solvent mixture as the continuous phase, charged pigment particles or pigment containing particles as the dispersed phase, and the charge of the pigment particles or pigment containing particles is mainly provided by:
   (i) a soluble fluorinated electron accepting or proton donating compound or polymer in the continuous phase and an electron donating or proton accepting compound or polymer in the dispersed phase; or
   (ii) a soluble fluorinated electron donating or proton accepting compound or polymer in the continuous phase and an electron accepting or proton donating compound or polymer in the dispersed phase.

The electron donating or proton accepting or electron accepting or proton donating compound or polymer in the dispersed phase may be on the surface of the particles.

The display may be any types of electrophoretic display known in the art, including the conventional types of electrophoretic displays.

The display may also be prepared from the microcup technology involving microembossing or photolithography. In this case, the display cells are of well-defined size, shape and aspect ratio, and are individually sealed, preferably with a polymeric sealing layer.

The display cells may be prepared by the microencapsulation technology (U.S. Pat. Nos. 5,961,804 and 5,930,026). In this type of the displays, the size of the display cells may range from 5–500 microns, preferably from 25 to 250 microns. The shell of the microcapsule cells is formed from interfacial polymerization/crosslinking of monomers. The dispersed phase or the internal phase in the interfacial encapsulation process comprises pigment microcapsules or microparticles of the present invention dispersed in a dielectric solvent.

The display may have the traditional up/down switching mode, the in-plane switching mode or the dual switching mode.

In the display having the traditional up/down switching mode or the dual switching mode, both the top and bottom layers are electrode plates, at least one of which is transparent and the individually sealed cells are enclosed between the two electrode plates. The up/down mode allows the charged pigment particles or pigment containing particles to move in the vertical (up/down) direction whereas the dual switching mode allows the pigment particles or pigment containing particles to move in either the vertical (up/down) direction or the planar (left/right) direction. In the display having the in-plane switching mode, the cells are sandwiched between an insulator layer and an electrode plate. The in-plane switching mode allows the pigment particles or pigment containing particles to move in the planar direction only.

EXAMPLES

The following examples are given to enable those skilled in the art to more clearly understand, and to practice, the present invention. They should not be considered as limiting the scope of the invention, but merely as being illustrative and representative thereof.

Example 1 (Comparative Example)

1.25 Parts of an acrylic particle (PA2D, average particle size=about 2 μm diameter, H. W. Sands Corp., Jupiter, Fla.) was dispersed into a solution containing 0.1 parts of a perfluorocarboxylic acid, Krytox® 157FSL (DuPont Performance lubricants, Deepwater, N.J.) and 34.2 parts of a 1% solution of fluorinated blue dye FC-3275 (3M, Specialty Chemicals Division, St. Paul, Minn.) in HT200 (Ausimont, Thorofare, N.J.) by using a homogenizer (PowerGen® 700, Fisher Scientific) at room temperature for 1 hour, followed by ultrasonication (Sonic Dismembrator® 550, Fisher Scientific) for 45 minutes. One drop of the dispersion fluid was placed between two pieces of ITO glass (Part No. CG-401N-S215, Delta Technologies, Limited, Stillwater, Minn.) using 35 micron PET films (DuPont, Hopewell, Va.) as the spacers. The device showed a very poor contrast ratio and a switching rate of about 1 Hz at 100 volt.

Example 2

The procedure of Example 1 was repeated, except that the acrylic particle was precoated with a basic copolymer of 4-vinylpyridine (90%) and butyl methacrylate (10%) (PVPyBMA) (Aldrich) by dispersing 20 parts of the acrylic particle in 20 parts of a 5% solution of the copolymer in methanol using a homogenizer (PowerGen® 700) for 1 hour, followed by ultrasonication (Sonic Dismembrator® 550) for 45 minutes. The coated acrylic particle dispersion was spray dried, ground with a mortar, dispersed into a solution containing 0.1 parts of a perfluorocarboxylic acid, Krytox® 157FSL (DuPont Performance lubricants, Deepwater, N.J.) and 34.2 parts of a 1% solution of fluorinated blue dye FC-3275 (3M, Specialty Chemicals Division, St. Paul, Minn.) in HT200 (Ausimont, Thorofare, N.J.) and evaluated as described in Example 1. The dispersion showed a switching rate of 7 Hz at 100V with a significantly improved contrast ratio.

Example 3 (Comparative Example)

50 Parts of a polymer coated $TiO_2$ particle TINT-AYD® PC9003 (0.2 to 0.4 μm in diameter, Elementis, Specialties, Colorants and Additives, Jersey City, N.J.) was added to 50 parts of ethanol, homogenized for 5 minutes, then ultrasonicated for 10 minutes. The resultant slurry (12 parts) was added into 100 parts of a solution containing 1.2% of Krytox® 157FSH in HT-200 and homogenized at room temperature (10K speed) for 30 minutes. The alcohol was stripped off at 80° C. and the dispersion was further ultrasonicated for 30 minutes, resulting in a dispersion of fine particles ranging from 1.0 to 3.0 μm in diameter as measured by Coulter LS 230 particle size analyzer. The blue dye FC-3275 (0.8% based on the dispersion) was added to the above dispersion and the resultant fluid was evaluated as described in Example 1. No observable contrast ratio and switching rate was detected at 100 volt.

Example 4

The procedure of Example 3 was repeated, except that the $TiO_2$ particles TINT-AYD® PC9003 were precoated with a basic copolymer (PVPyBMA) of 4-vinylpyridine (90%) and butyl methacrylate (10%) (Aldrich). The PC-9003 particles (50 parts) were mixed with 25 parts of ethanol and 25 parts of 10% solution of the PVPyBMA copolymer in methanol, homogenized for 5 minutes and then ultrasonicated for 10 minutes. The resultant slurry (12 parts) was added into 100 parts of a solution containing 1.2% of Krytox® 157FSH in HT-200 and homogenized at room temperature (10K speed) for 30 minutes. The alcohol was stripped off at 80° C. and the dispersion was further ultrasonicated for 30 minutes. The blue dye FC-3275 (0.8% based on the dispersion) was added to the above dispersion and the resultant fluid was evaluated as described in Example 3. An acceptable contrast ratio was observed and the switching rates were 12, 2, and about 1 Hz at 100, 20 and 10 volts respectively. Results are shown in Table 1.

Example 5

The procedure of Example 4 was repeated, except that the concentration of the basic poly(4-vinylpyridine-co-butyl methacrylate) (PVPyBMA) was increased from 5 wt % to 8 wt % based on TINT-AYD® PC9003. A contrast ratio higher than 10 was observed and the switching rates were 20, 3, and 1 Hz at 100, 20 and 10 volts respectively. Results are shown in Table 1.

Example 6

The procedure of Example 4 was repeated, except that the ethanol and methanol were replaced by $CHCl_3$ in the first coating step with the copolymer PVPyBMA onto the TiO2 particles TINT-AYD® PC9003. A good contrast ratio ($\geq 10$) was observed and the switching rates were 15, 2, and about 1 Hz at 100, 20 and 10 volts respectively. Results are shown in Table 1.

Example 7

Synthesis of a Multifunctional Rf-amine

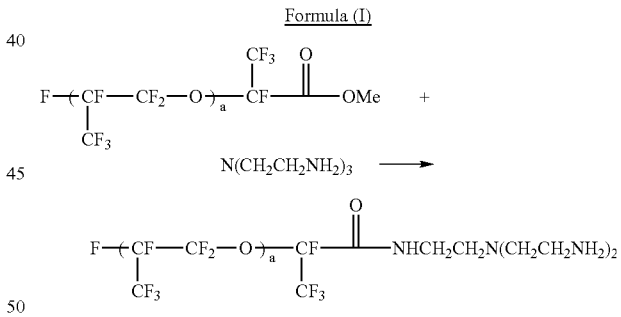

Krytox® methyl ester (17.8 g, MW=~1780, a (weight fraction)=0.933 with 10 repeating units, DuPont) was dissolved in a solvent mixture containing 12 g of 1,1,2-trichlorotrifluoroethane (Aldrich) and 1.5 g of α,α,α-trifluorotoluene (Aldrich). The resultant solution was added drop by drop into a solution containing 7.3 g of tris(2-aminoethyl)amine (Aldrich) in 25 g of α,α,αtrifluorotoluene and 30 g of 1,1,2-trichlorotrifluoroethane over 2 hours with stirring at room temperature. The mixture was then stirred for another 8 hours to allow the reaction to complete. The IR spectrum of the product clearly indicated the disappearance of C═O vibration for methyl ester at 1780 $cm^{-1}$ and the appearance of C═O vibration for the amide product at 1695 $cm^{-1}$. Solvents were removed by rotary evaporation followed by vacuum stripping at 100° C. for 4–6 hours. The crude product was then dissolved in 50 ml of PFS2 solvent (low molecular weight perfluoropolyether from Ausimont), extracted with 20 ml of ethyl acetate three times and then dried to yield 17 g of purified product (Rf-amine1900) which showed excellent solubility in HT200.

Other multifunctional Rf amines of Formula (I) having different molecular weights such as Rf-amine4900 (a=0.977 with 30 repeating units), 2000 (a=0.939 with 11 repeating units), Rf-amine800 (a=0.848 with 4 repeating units) and Rf-amine650 (a=0.807 with 3 repeating units) were also synthesized according to the same procedure. Rf-amine350 was also prepared by the same procedure, except that the Krytox® methyl ester was replaced by $CF_3CF_2CF_2COOCH_3$ (from SynQuest Labs, Alachua Fla.).

Example 8

50 Parts of a polymer coated $TiO_2$ particle TINT-AYD® PC9003 was added to 50 parts of methanol containing 5 parts of polyacrylic acid (PAA, Mw~110K, Aldrich) to form a $TiO_2$ slurry. The slurry was homogenized for 5 minutes and then ultrasonicated for 10 minutes at room temperature. The slurry (12 parts) was added into 100 parts of a HT200 solution containing 1.2% of Rf-amine2000 (from Example 7) and homogenized at room temperature (10K speed) for 30 minutes The alcohol was stripped off at 80° C. and the dispersion was further ultrasonicated for 30 minutes. The methanol (6 g) was added to the dispersion under homogenization. The alcohol was stripped off at 80° C. and the dispersion was further ultrasonicated for 30 minutes. The blue dye FC-3275 (0.8% based on the dispersion) was added to the above dispersion and the resultant fluid was evaluated as described in Example 1. Results are shown in Table 1.

Example 10 (Comparative Example)

50 Parts of a polymer coated $TiO_2$ particle TINT-AYD® PC9003 was added to 50 parts of methanol containing 5 parts of polyacrylic acid (PAA, Mw~110K, Aldrich) to form a $TiO_2$ slurry. The slurry was homogenized for 5 minutes and then ultrasonicated for 10 minutes. The slurry (12 parts) was added into 100 parts of a solution containing 1.2% of Fluorolink® D10 (from Ausimont) in HT-200 and homogenized at room temperature (10K speed) for 30 minutes to form a dispersion. The compound 4-(aminomethyl)pyridine (0.3 g) was added to the dispersion under homogenization. The alcohol was stripped off at 80° C. and the dispersion was further ultrasonicated for 30 minutes. The blue dye FC-3275 (0.8% based on the dispersion) was added to the above dispersion and the resultant fluid was evaluated as described in Example 1. Results are shown in Table 1.

TABLE 1

Dispersion Performance of Examples (Examples 4–10)

| Example | Mean Particle Size (μm) | Active groups on particle surface | Soluble CCA in the continuous phase | Charge of Particles | Contrast ratio | Switching Rate (Hz) |
|---|---|---|---|---|---|---|
| 4 | 1.8 ± 0.9 | Pyridine groups from PVPyBMA | Krytox® (Rf-COOH) | Positive | ~10 | 12 @ 100 v<br>2 @ 20 v<br>1 @ 10 v |
| 5 | 1.7 ± 0.7 | Pyridine groups from PVPyBMA | Krytox® (Rf-COOH) | Positive | ~15 | 20 @ 100 v<br>3 @ 20 v<br>1 @ 10 v |
| 6 | 1.8 ± 0.8 | Pyridine groups from PVPyBMA | Krytox® (Rd-COOH) | Positive | ~15 | 15 @ 100 v<br>2 @ 20 v<br>1 @ 10 v |
| 8 | 1.8 ± 0.9 | —COOH groups from PAA | Rf-amine (Mw~1890) | Negative | ~10 | 10 @ 100 v<br>1 @ 20 v |
| 9 | 1.8 ± 0.9 | Pyridine groups from PVPyBMA | Insoluble acid, p-toluene sulfonic acid | Slight Positive | 1.5 | — |
| 10 | 1.8 ± 0.9 | —COOH from PAA | Insoluble base, 4-(aminomethyl) pyridine | Slight Negative | 2 | — | blue dye FC-3275 (0.8% based on the dispersion) was added to the above dispersion and the resultant fluid was evaluated as described in Example 1. Results are shown in Table 1.

Example 9 (Comparative Example)

50 Parts of a polymer coated $TiO_2$ particle TINT-AYD® PC9003 was mixed with 25 parts of ethanol and 25 parts of a 10% solution of 4-vinylpyridine (90%) and butyl methacrylate (10%) copolymer (PVPyBMA) in methanol to form a $TiO_2$ slurry. The slurry was homogenized for 5 minutes and then ultrasonicated for 10 minutes. The slurry (12 parts) was added into 100 parts of a solution containing 1.2% of Fluorolink® D10 (Ausimont) in HT-200 and homogenized at room temperature (10K speed) for 30 minutes to obtain a dispersion. A solution of 5% p-toluenesulfonic acid in Examples 11a and 11b 3.82 Grams of Desmodur® N3400 aliphatic polyisocyanate (BayerAG) and 1.87 g of Multranol® 9175 (Bayer AG) were dissolved in 4.2 g of MEK (methyl ethyl ketone). To the resulting solution, 6.94 g of $TiO_2$ R900 (DuPont) was added and homogenized for 1 minute at room temperature; 0.013 g of dibutyltin dilaurate (Aldrich) was added and homogenized for 2 minutes; 26.70 g of a HT-200 solution containing 0.67 g of Rf-amine4900 (from Example 7) was added and homogenized for an additional minute; and the MEK was removed by vacuum at room temperature.

The slurry prepared above was emulsified slowly at room temperature by a homogenizer into 30 g of a HT-200 solution containing 0.66 g of Rf-amine1900 (from Example 7), 1.3 g of Krytox® 157 FSL, 0.15 g of tris(2-aminoethyl) amine (Aldrich) and 0.40 g of 4-(aminomethyl)pyridine (Aldrich). The resulting microcapsule dispersion was heated at 80° C. for 2 hours with stirring to post cure the particles.

Two EPD fluids containing 1 wt % of perfluorinated Cu phthalocyanine dye FC-3275 (from 3M) and 8 wt % solid of the $TiO_2$ microcapsules in HT200 (Example 11a) and in a 4:1 (w/w) mixture of HT200 and ZT180 (Example 11b) were prepared. Their switching performances in an EPD cell between two ITO glass plates (Part No. CG-401N-S215, Delta Technologies, Limited, Stillwater, Minn.) using 35 micron PET films (DuPont, Hopewell, Va.) as the spacers are given in Table 2.

Example 12

The procedure of Example 11 was repeated, except that 4-(aminomethyl)-pyridine was replaced with 1-(2-aminoethyl)piperazine (Aldrich). Results are shown in Table 2.

Example 13

The procedure of Example 11 was repeated, except that 4-(aminomethyl)-pyridine was replaced by 1-(3-aminopropyl)imidazole (Aldrich). Results are shown in Table 2.

Example 14 (Comparative Example)

3.4 Grams of a 5% solution of AOT (dioctyl sulfosuccinate, sodium salt, from Aldrich) in MEK was added to 50 g of the microcapsule dispersion as prepared in Example 12. The dispersion was heated at 80–85° C. for 1 hour and the residual MEK was removed under vacuum. The EPD fluid was prepared as in Example 11a and the switching performances are shown in Table 2 below.

Example 15

4.54 Grams of Desmodur® N3400 aliphatic polyisocyanate (from Bayer AG) and 0.77 g of 1-[N,N-bis(2-hydroxyethyl)amino]2-propanol (Aldrich) were dissolved in 3.74 g of MEK. To the resulting solution, 5.90 g of $TiO_2$ R900 (DuPont) was added and homogenized for 2 minutes at 5–10° C.; 0.013 g of dibutyltin dilaurate (Aldrich) was added and homogenized for another 30 seconds at 5–10° C.; and finally 20 g of a HT-200 solution containing 0.47 g of Rf-amine4900 (from Example 7) was added and homogenized for an additional minute.

The slurry prepared above was emulsified slowly at room temperature by a homogenizer into 36 g of a HT-200 solution containing 0.09 g of Rf-amine2000 (from Example 7), 1.4 g of Krytox® 157 FSL, 0.43 g of tris(2-aminoethyl) amine and 0.15 g of 4-(aminomethyl)pyridine. The resulting microcapsule dispersion was heated at 80° C. for 3 hours under mechanical stirring to remove MEK and post cure the microcapsules. The EPD fluid was prepared and evaluated as in Example 11b. The result is given in Table 2.

Example 16

4.54 Grams of N3400 aliphatic polyisocyanate (Bayer AG) and 0.77 g of 1-[N,N-bis(2-hydroxyethyl)amino]2-propanol (Aldrich) were dissolved in 3.74 g of MEK. To the resulting solution, 5.90 g of $TiO_2$ R900 (DuPont) was added and homogenized for 2 minutes at 5–10° C.; 0.013 g of dibutyltin dilaurate (Aldrich) was added and homogenized for another 30 seconds at 5–10° C.; and finally 20 g of a HT-200 solution containing 0.47 g of Rf-amine 4900 (from Example 7) was added and homogenized for an additional minute.

The slurry prepared above was emulsified slowly at room temperature by a homogenizer into 36 g of a HT-200 solution containing 0.92 g of Rf-amine350 (from Example 7), 0.5 g of Krytox® FS1366 and 0.48 g of 1-(2-aminoethyl) piperazine. The resulting microcapsule dispersion was heated at 80° C. for 3 hours under mechanical stirring to remove MEK and post cure the microcapsules. The EPD fluid was prepared and evaluated as in Example 15. The result is given in Table 2.

Example 17

4.54 Grams of Desmodur® N3400 aliphatic polyisocyanate (Bayer AG) and 0.77 g of 1-[N,N-bis(2-hydroxyethyl)amino]2-propanol (Aldrich) were dissolved in 3.74 g of MEK. To the resulting solution, 5.90 g of $TiO_2$ R900 (DuPont) was added and homogenized for 2 minutes at 5–10° C. after which 0.013 g of dibutyltin dilaurate (Aldrich) and 0.2 g of 5% solution of $Zr(acac)_4$ (from Aldrich, acac=acetylacetonate) in ethyl acetate were added. The slurry was homogenized for another 30 seconds at 5–10° C. after which 20 g of a HT-200 solution containing 0.47 g of Rf-amine4900 (from Example 7) was added and homogenized for an additional minute.

The slurry prepared above was emulsified slowly at room temperature by a homogenizer into 36 g of a HT-200 solution containing 0.92 g of Rf-amine350 (from Example 7), 0.5 g of Krytox® FS1366 and 0.48 g of 1-(2-aminoethyl) piperazine. The resulting microcapsule dispersion was heated at 80° C. for 3 hours under mechanical stirring to remove MEK and post cure the microcapsules. The EPD fluid was prepared and evaluated as in Example 15. The result is given in Table 2.

Example 18

The procedure of Example 17 was repeated except that the 36 g of HT-200 solution also contain 0.30 g of zirconium (hexafluoroacetoacetate) $[Zr(HFA)_4]$ (from Gelest).

Example 19 (Comparative Example)

The procedure of Example 17 was repeated except that the $Zr(acac)_4$ solution was replaced with 0.15 g of 5% AOT solution in MEK. The EPD fluid was prepared and evaluated as in Example 15. The result is given in Table 2.

TABLE 2

EPD Performance (Examples 11–19)

| Example | Mean Size (μm) | Contrast Ratio | Ton @ 30 V (msec) | Toff @ 30 V (msec) | Solvent |
|---|---|---|---|---|---|
| 11a | 1.6 ± 0.7 | 35 | 330 | 280 | HT200 |
| 11b | | | 120 | 110 | HT200/ZT180 = 4/1 |
| 12 | 1.5 ± 0.8 | 10 | 100 | 100 | HT200 |
| 13 | 1.8 ± 0.9 | 20 | 350 | 300 | HT200 |
| 14 | 1.5 ± 0.8 | 10 | 250 | 300 | HT-200 |
| 15 | 1.5 ± 0.8 | 30 | 70 | 70 | HT200/ZT180 = 4/1 |
| 16 | 1.5 ± 0.8 | 15 | 90 | 120 | HT200/ZT180 = 4/1 |
| 17 | 1.7 ± 0.8 | 15 | 175 | 288 | HT200/ZT180 = 4/1 |
| 18 | 1.7 ± 0.8 | 11 | 250 | 330 | HT200/ZT180 = 4/1 |
| 19 | 1.7 ± 0.8 | 14 | 350 | 400 | HT200/ZT180 = 4/1 |

Example 20

68.81 Parts (w/w) of Ti-Pure R706 (DuPont) particles were dispersed in a solution comprising 22.12 parts of isobornylmethacrylate, 7.37 parts of dodecylmethacrylate (both Aldrich) and 1.7 parts of Disperbyk® 142 (BYK Chemie) using sonication (Fisher Model 550) with a ½ inch diameter flat tip for 15 minutes by applying an on/off pulsed mode at 25° C. To 7.55 parts of the above $TiO_2$ slurry in a vial 0.03 parts of radical initiator AIBN (VAZO64 from DuPont), 0.96 parts of Desmodur® N3400 (Bayer), 0.28 parts of SR399 (multifunctional acrylate from Sartomer), 0.28 parts of HDODA (diacrylate from UCB) and 0.1 part of 4-vinylpyridine (Aldrich) were added. The resultant $TiO_2$ dispersion was added drop-wise and emulsified into a solution composed of 0.64 parts of Krytox® 157FSL (DuPont) and 60 parts of Galden HT200 (Ausimont) at 35° C. using a homogenizer (PowerGen® 700) at 7500 rpm. After 1 minute, a solution containing 30 parts of HT200 and 0.15 parts of Rf-amine1900 (from Example 7) was added at once into the flask. After 1 hour, the flask was purged with argon for 20 minutes and the microcapsule slurry was kept at 70° C. for 8 hours under argon with stirring at 7500 rpm. The evaluation of Example 20 was performed as above and the results are given in Table 3.

Example 21

64.76 Parts (w/w) Ti-Pure R706 (DuPont) particles were dispersed as in Example 17 in a solution containing 23.85 parts of isobornylmethacrylate (from Aldrich), 2.16 parts of Sartomer® SR399 (from Sartomer), 2.92 parts of HDODA (UCB), 4.71 parts of 4-vinylpyridine (Aldrich) and 1.6 parts of Disperbyk® 142 (from BYK Chemie). To 20.59 parts of the above $TiO_2$ slurry in a vial, 0.35 parts of AIBN (VAZO64, DuPont), 5.47 parts of Desmodur® N3400 and 1.66 parts of Krytox® 157FSL (DuPont) were added. The resultant $TiO_2$ dispersion was added drop-wise and emulsified into a solution containing 0.66 parts of Rf-amine1900 and 64 parts of Galden HT-200 (Ausimont) at 35° C. under high shear mixing using a PowerGen® 700 spinning at 25,000 rpm. After 1 minute, a solution containing 7 parts of Galden HT200 and 0.28 parts of tris(2-aminoethyl)amine was added to the dispersion. After four additional minutes, the dispersion was transferred from the reactor to an uncapped vial, purged with argon for 20 minutes and then capped and shaken at 70° C. for 8 hours. The evaluation of Example 21 was performed as above and the results are given in Table 3.

TABLE 3

EPD performance of Examples 20–21

| Example | Mean Size | Contrast Ratio | Ton @ 30 V (msec) | Toff @ 30 V (msec) |
|---|---|---|---|---|
| 20 | 2.1 ± 1.7 | 11 | 500 | 275 |
| 21 | 2.8 ± 1.2 | 12 | 325 | 140 |

Example 22

18.2 Grams TiO2 R900 (DuPont) was added to a solution consisting of 10.9 g of MEK, 12.6 g of N3400 aliphatic polyisocyanate (Bayer AG) and 2.0 g of 1-[N,N-bis(2-hydroxyethyl)amino]-2-propanol (Aldrich). The resultant slurry was homogenized for 1 minute at 5–10° C.; 0.02 g of dibutyltin dilaurate (Aldrich) was added and homogenized for an additional minute; and finally a solution containing 55 g of HT-200 and 1.4 g of Rf-amine4900 (from Example 7) was added and homogenized again for 3 more minutes at room temperature.

The slurry prepared above was added slowly over 10 minutes at room temperature under homogenization into a mixture containing 95 g of HT-200, 1.8 g of Rf-amine2000 (from Example 7) and 3.24 g of Rf-amine350 (from Example 7). The resultant microcapsule dispersion was kept stirring under low shear by a mechanical stirrer at 35° C. for 30 minutes and then at 85° C. for 3 hours to remove MEK and post cure the microcapsules.

The microcapsule dispersion showed a narrow particle size distribution ranging from 0.5–3.5 microns. The microcapsules were separated by centrifuge, diluted and redispersed in HT-200. The EPD fluid was prepared and evaluated as in Example 11a except the ITO plates were precoated with a 5 micron polystyrene layer. A contrast ratio of about 20 at 85V and a $T_{tot}$ of 10 msec were observed wherein $T_{tot}$ is the sum of $T_{on}$ (time on) and $T_{off}$ (time off). The performance is satisfactory even after prolonged switching cycles.

Example 23

5.9 Grams of TiO2 R900 (DuPont) was added to a solution consisting of 3.77 g of MEK, 4.54 g of N3400 aliphatic polyisocyanate (Bayer AG) and 0.77 g of 1-[N,N-bis(2-hydroxyethyl)amino]-2-propanol (Aldrich). The resultant slurry was homogenized for 1 minute at 5–10° C.; 0.01 g of dibutyltin dilaurate (Aldrich) was added and homogenized for an additional minute; and finally a solution containing 20 g of HT-200 and 0.47 g of Rf-amine4900 (from Example 7) was added and homogenized again for 3 more minutes at room temperature.

The slurry prepared above was added slowly over 5 minutes at room temperature under homogenization into a mixture containing 31 g of HT-200 and 2.28 g of Rf-amine650 (from Example 7). The resultant microcapsule dispersion was stirred under low shear by a mechanical stirrer at 35° C. for 30 minutes, then heated to 85° C. to remove MEK and post cure the internal phase for three hours.

The dispersion showed a narrow particle size distribution ranging from 0.5–3.5 microns. The microcapsules were separated by centrifuge, diluted and redispersed in HT-200. The EPD fluid was prepared and evaluated as in Example 11a except the ITO plates were precoated with a 5 micron polystyrene layer. A contrast ratio of about 20 at 85V and a $T_{tot}$ of 10 msec were observed. The performance is satisfactory even after prolonged switching cycles.

It can be seen from the above examples that the novel electrophoretic dispersion has resulted in significant improvements in switching rate, rising time, falling time and contrast ratio of the display. The novel electrophoretic dispersions also showed a significantly better dispersion stability and less particle deposition on the electrodes after prolonged switching cycles.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

It is therefore wished that this invention to be defined by the scope of the appended claims as broadly as the prior art will permit, and in view of the specification.

What is claimed is:

1. An electrophoretic dispersion comprising a fluorinated solvent as a continuous phase, charged pigment particles or pigment containing microcapsules as a dispersed phase and a charge controlling agent which comprises:
   (i) a soluble fluorinated electron accepting or proton donating compound or polymer in the continuous phase and an electron donating or proton accepting compound or polymer in the dispersed phase; or
   (ii) a soluble fluorinated electron donating or proton accepting compound or polymer in the continuous phase and an electron accepting or proton donating compound or polymer in the dispersed phase.

2. The dispersion of claim 1 wherein said fluorinated solvent has a dielectric constant of 1.7 to 30.

3. The dispersion of claim 2 wherein said fluorinated solvent has a dielectric constant of 1.7 to 5.

4. The dispersion of claim 1 wherein said fluorinated solvent is a solvent or solvent mixture of perfluoroalkane, perfluorocycloalkane, perfluoroarylalkane, perfluoro-tert-amine, perfluoropolyether, or hydrofluoropolyether.

5. The dispersion of claim 4 wherein said fluorinated solvent is FC-43 or FC-70.

6. The dispersion of claim 5 wherein said fluorinated solvent is a perfluoropolyether or hydrofluoropolyether.

7. The dispersion of claim 6 wherein said fluorinated solvent is Ausimont HT-170, HT-200, HT-230, ZT-180, Dupont K-6 or K7.

8. The dispersion of claim 1 wherein said fluorinated solvent is a polymer or oligomer having a molecular weight less than 50,000.

9. The dispersion of claim 8 wherein said fluorinated solvent is poly(perfluoropropylene oxide) or poly(chlorotrifluoroethylene).

10. The dispersion of claim 1 wherein said electron accepting or proton donating compound or polymer is selected from the group consisting of alkyl, aryl, arylalkyl or alkylaryl carboxylic acids and salts thereof, alkyl, aryl, arylalkyl or alkylaryl sulfonic acids and salts thereof, tetraalkylammonium and other alkylaryl ammonium salts, pyridinium salts and alkyl, aryl, alkylaryl or arylalkyl derivatives thereof, sulfonamides, perfluoroamides, alcohols, phenols, salicylic acids and salts thereof, acrylic acid, sulfoethyl methacrylate, styrene sulfonic acid, itaconic acid, maleic acid, hydrogen hexafluorophosphate, hydrogen hexafluoroantimonate, hydrogen tetrafluoroborate, hydrogen hexafluoroarsenate (V) and organometallic compounds or complexes containing an electron deficient metal group.

11. The dispersion of claim 10 wherein said electron deficient metal group is tin, zinc, magnesium, copper, aluminum, chromium, titanium, cobalt, or zirconium.

12. The dispersion of claim 11 wherein said electron deficient metal group is copper, aluminum, titanium or zirconium.

13. The dispersion of claim 12 wherein said electron deficient metal group is zirconium or copper.

14. The dispersion of claim 1 wherein said electron accepting or proton donating compound or polymer is a protonated polyvinylpyridine copolymer or a quarternium salt thereof.

15. The dispersion of claim 1 wherein said electron accepting or proton donating compound or polymer is zirconium (tetraacetoacetate).

16. The dispersion of claim 1 wherein said electron donating or proton accepting compound or polymer is selected from the group consisting of amines, pyridines, guanidines, ureas, thioureas, imidazoles, tetraarylborate and the alkyl, aryl, alkylary or arylalkyl derivatives thereof.

17. The dispersion of claim 16 wherein said electron donating or proton accepting compound or polymer is a copolymer of 2-vinyl pyridine, 4-vinyl pyridine or 2-N,N-dimethylaminoethyl acrylate or methacrylate with styrene, alkyl acrylate, alkyl methacrylate, aryl acrylate or aryl methacrylate.

18. The dispersion of claim 17 wherein said electron donating or proton accepting compound or polymer is poly(4-vinylpyridine-co-styrene), poly(4-vinlypyridine-co-methyl methacrylate) or poly(4-vinlypyridine-co-butyl methacrylate).

19. The dispersion of claim 16 wherein said amine is a tert-amine or tert-aniline.

20. The dispersion of claim 1 wherein said fluorinated electron accepting or proton donating compound or polymer is selected from the group consisting of fluorinated alkyl, aryl, alkylaryl or arylalkyl carboxylic acids, fluorinated alkyl, aryl, alkylaryl or arylalkyl sulfonic acids, fluorinated sulfonamides, fluorinated carboxamides, fluorinated alcohols, fluorinated ether alcohols, fluorinated phenols, fluorinated salicylic acids, fluorinated pyridinium salts or quaterium ammonium salts, hydrogen tetrafluoroborate, hydrogen hexafluorophosphate, hydrogen hexafluoroantimonate, hydrogen hexafluoroarsenate (V), fluorinated organometallic compounds or fluorinated complexes containing an electron deficient metal group.

21. The dispersion of claim 20 wherein said electron deficient metal group is tin, zinc, magnesium, copper, cobalt, aluminum, chromium, titanium or zirconium.

22. The dispersion of claim 20 wherein said electron accepting or proton donating compound or polymer is a metal perfluoroacetoacetonate, a fluorinated quinolinol metal complex or a metal phthalocyanine.

23. The dispersion of claim 22 wherein said metal perfluoroacetoacetonate is zirconium or copper perfluoroacetoacetonate.

24. The dispersion of claim 22 wherein said fluorinated quinolinol metal complex is fluorinated quinolinol Al complex.

25. The dispersion of claim 22 wherein said metal phthalocyanine is copper, zinc or magnesium phthalocyanine.

26. The dispersion of claim 20 wherein said fluorinated alkyl, aryl, alkylaryl or arylalkyl carboxylic acid is a perfluorocarboxylic acid.

27. The dispersion of claim 26 wherein said perfluorocarboxylic acid is Krytox® 157 FSL, Krytox® 157 FSM or Krytox® 157 FSH.

28. The dispersion of claim 1 wherein said fluorinated electron donating or proton accepting compound or polymer is selected from the group consisting of fluorinated amines, fluorinated pyridines, fluorinated alkyl or aryl guanidines, fluorinated ureas, fluorinated thioureas, fluorinated tetraborates and derivatives thereof.

29. The dispersion of claim 28 wherein said fluorinated amine is a fluorinated tert-amine or tert-aniline.

30. The dispersion of claim 29 wherein said fluorinated amine is a derivative of a perfluoropolyether.

31. The dispersion of claim 30 wherein said fluorinated amine is a precondensate of a multifunctional amine and a perfluoropolyether methyl ester or perfluoropolyether isocyanate.

32. The dispersion of claim 1 wherein each of the proton accepting compound or polymer and the fluorinated proton donating compound or polymer of (i) or the proton donating compound or polymer and the fluorinated proton accepting compound or polymer of (ii) is present in the amount of 0.05 to 30 weight percent of the pigment particles or pigment containing microcapsules.

33. The dispersion of claim 32 wherein each of the proton accepting compound or polymer and the fluorinated proton donating compound or polymer of (i) or the proton donating compound or polymer and the fluorinated proton accepting compound or polymer of (ii) is present in the amount of 0.5 to 15 weight percent of the pigment particles or pigment containing microcapsules.

34. The dispersion of claim 1 wherein said dispersed phase comprises pigment particles microencapsulated or coated with a polymer matrix.

35. The dispersion of claim 34 wherein said microencapsulated or coated pigment particles are prepared by interfacial or in-situ polymerization/crosslinking using reactive charge controlling agents.

36. The dispersion of claim 35 wherein said reactive charge controlling agent is selected from the group consisting of electron donating or proton accepting or electron accepting or proton donating compounds or polymers, having at least one reactive moiety.

37. The dispersion of claim 36 wherein said reactive charge controlling agent contains at least a reactive functional moiety selected from the group consisting of unsaturated double bonds, primary or secondary amines, anilines, ureas, thioureas, alcohols, thiols, isocyanates, thioisocyanates, imines, epoxides, acid anhydrides, acid chlorides and chloroformates.

38. The dispersion of claim 34 wherein said microcapsules are prepared by microencapsulation involving in-situ radical polymerization with reactive charge controlling agents having unsaturated double bonds.

39. The dispersion of claim 38 wherein said reactive charge controlling agent is selected from the group consisting of 2-vinyl pyridine, 4-vinylpyridine, N,N-dimethylaminoethyl acrylate, methacrylic acid, acrylic acid, styrene sulfonic acid, itaconic acid, maleic acid or their salts, and derivatives and co-polymers thereof.

40. The dispersion of claim 34 wherein said microcapsules are prepared by microencapsulation involving in-situ condensation polymerization or crosslinking with reactive charge controlling agents.

41. The dispersion of claim 40 wherein said reactive charge controlling agent is selected from the group consisting of triethanolamine, diethanolaniline, 1-[N,N-bis(2-hydroxyethyl)amino]-2-propanol, tris-(2-aminoethyl)amine, N,N-(2-hydroxyethyl)aniline, N,N,N',N'-tetrakis(2-hydroxypropyl)ethylenediamine, N,N,N',N'-tetrakis(2-hydroxyethyl)ethylenediamine and derivatives thereof.

42. The dispersion of claim 34 wherein said microcapsules are prepared by microencapsulation involving interfacial polymerization or crosslinking with reactive charge controlling agents.

43. The dispersion of claim 42 wherein said reactive charge controlling agent is 4-aminomethyl pyridine, 1-(2-aminoethyl) piperazine, 1-(3-aminopropyl) imidazole, sulfonated polyisocyanate or a salt thereof.

44. The dispersion of claim 35 wherein said reactive charge controlling agent is a fluorinated reactive electron accepting or proton donating or electron donating or proton accepting compound or polymer having at least one reactive functional moiety selected from the group consisting of thiol, hydroxy, amide, primary and secondary amine or aniline, urea, thiourea, imine, isocyanate, thioisocyanate, epoxide, silane, acid anhydride, acid chloride and chloroformate, and unsaturated double bonds.

45. The dispersion of claim 44 wherein said reactive functional moiety is amine, hydroxy, thiol, isocyanate or thioisocyanate.

46. The dispersion of claim 44 wherein said reactive charge controlling agent is perfluorinated.

47. The dispersion of claim 34 wherein said microcapsules are prepared by microencapsulation involving interfacial polymerization or crosslinking with reactive charge controlling agents followed by solvent evaporation or in-situ polymerization or crosslinking in the internal phase to harden the microcapsules.

48. An electrophoretic display which comprises:
(a) a top layer and a bottom layer, at least one of which is transparent,
(b) an array of cells sandwiched between the two layers and the cells are filled with an electrophoretic dispersion, which dispersion comprises a fluorinated solvent as a continuous phase, charged pigment particles as a dispersed phase, and a charge controlling agent which comprises:
(i) a soluble fluorinated electron accepting or proton donating compound or polymer in the continuous phase and an electron donating or proton accepting compound or polymer in the dispersed phase; or
(ii) a soluble fluorinated electron donating or proton accepting compound or polymer in the continuous phase and an electron accepting or proton donating compound or polymer in the dispersed phase.

49. The electrophoretic display of claim 47 wherein said cells are prepared from microcups and are individually sealed with a polymeric sealing layer.

50. The electrophoretic display of claim 47 wherein said cells are microcapsules.

51. The electrophoretic display of claim 47 wherein both the top and bottom layers are electrode plates and said display has the traditional up/down switching mode.

52. The electrophoretic display of claim 47 wherein one of the top and bottom layers is an electrode plate and the other is an insulator layer and said display has an in-plane switching mode.

53. The electrophoretic display of claim 47 wherein both the top and bottom layers are electrode plates and said display has a dual-switching mode.

54. The dispersion of claim 1 wherein said charge controlling agent has said soluble fluorinated electron accepting or proton donating compound or polymer and said electron donating or proton accepting compound or polymer of (i), or said soluble fluorinated electron donating or proton accepting compound or polymer, and said electron accepting or proton donating compound or polymer of (ii) in the same molecule.

55. The dispersion of claim 54 wherein the charge controlling agent is a condensate product prepared from perfluoroester and tris(2-aminoethyl)amine, 1[N,N-bis(2-hydroxyethyl)amino]2-propanol or a derivative thereof.

56. The dispersion of claim 54 wherein said same molecule is covalently linked to the particles in the dispersed phase.

57. An electrophoretic dispersion comprising a fluorinated solvent as a continuous phase, charged pigment particles or pigment containing microcapsules as a dispersed phase and a charge controlling agent comprising a soluble fluorinated donor/acceptor moiety and a complementary acceptor/donor moiety in the same molecule wherein said fluorinated donor/acceptor moiety is compatible with the continuous phase and the complementary acceptor/donor moiety is incompatible with the continuous phase.

58. The dispersion of claim 8 wherein said fluorinated solvent is a polymer or oligomer having a molecular weight less than 20,000.

59. The dispersion of claim 37 wherein said unsaturated double bond is vinyl, diene, acrylate or methacrylate.

60. The dispersion of claim 44 wherein said unsaturated double bond is vinyl, diene, acrylate or methacrylate.

* * * * *